United States Patent
Slavin

[11] Patent Number: 5,974,151
[45] Date of Patent: Oct. 26, 1999

[54] PUBLIC KEY CRYPTOGRAPHIC SYSTEM HAVING DIFFERENTIAL SECURITY LEVELS

[76] Inventor: Keith R. Slavin, 3141 SW. 176th Ave., Aloha, Oreg. 97006

[21] Appl. No.: 08/742,982

[22] Filed: Nov. 1, 1996

[51] Int. Cl.[6] .................................................. H04L 9/30
[52] U.S. Cl. ................................................................ 380/30
[58] Field of Search ................................................ 380/30

[56] References Cited

U.S. PATENT DOCUMENTS

| | | | |
|---|---|---|---|
| 4,405,829 | 9/1983 | Rivest et al. | 380/30 |
| 4,514,592 | 4/1985 | Miyaguchi | 380/30 |
| 5,146,500 | 9/1992 | Maurer | 380/30 |
| 5,159,632 | 10/1992 | Crandall | 380/30 |
| 5,199,070 | 3/1993 | Matsuzaki | 380/30 |
| 5,519,778 | 5/1996 | Leighton et al. | 380/30 |
| 5,557,346 | 9/1996 | Lipner et al. | 380/30 |
| 5,557,678 | 9/1996 | Ganesan | 380/30 |
| 5,557,765 | 9/1996 | Lipner et al. | 380/30 |
| 5,633,928 | 5/1997 | Lenstra et al. | 380/30 |
| 5,666,414 | 9/1997 | Micali | 380/30 |

*Primary Examiner*—Salvatore Cangialosi
*Attorney, Agent, or Firm*—Bennet K. Langlotz

[57] ABSTRACT

A method of encoded communication in which a receiver generates a receiver public key by looking up a monitoring authority public key, multiplying four prime numbers, and encoding the identities of two of the prime numbers with the monitoring authority public key. The receiver communicates the public key to a sender, who creates a message, encodes it with the receiver public key, and transmits it to the receiver. The receiver then decodes the encoded message with the four prime numbers. The monitoring authority may decode the two prime numbers of the receiver's key, and factorize the product of the remaining primes. An unauthorized party would be faced with the much more difficult or impossible task of factorizing the original product of the four primes.

13 Claims, 5 Drawing Sheets

| $E_{m1} =$ | $E_{m1}$ |
| --- | --- |
| $E_{m2} =$ | $E_{m2}$ |

| $E_{u1} =$ | (p1 × q1 × p2 × q2), e, $f_{em1}$(p2, q2), $f_{em2}$(p2, q2) |
| --- | --- |
| $E_{u2} =$ | (p1' × q1' × p2' × q2'), e', $f_{em1}$(p2', q2'), $f_{em2}$(p2', q2') |
| ... | ... |
| $E_{un} =$ | (p1" × q1" × p2" × q2"), e", $f_{em1}$(p2", q2"), $f_{em2}$(p2", q2") |

PUBLIC KEY CRYPTOGRAPHIC SYSTEM HAVING DIFFERENTIAL SECURITY LEVELS

FIELD OF THE INVENTION

The invention relates to data communication, and more particularly to cryptography for secure data transmission.

BACKGROUND AND SUMMARY OF THE INVENTION

Electronic messages are normally transmitted between remote correspondents via a communications system typically including a network of interconnected computers. Such messages are readily intercepted and viewed by others using the network. Thus, correspondents desiring privacy may encrypt or encode a message in a way that only the recipient can decrypt or decode it to view the message contents. A common encryption technique is disclosed in U.S. Pat. No. 4,405,829 to Rivest et al., which is incorporated by reference. The technique is also known as the RSA technique.

Rivest discloses a "public key" technique in which each user desiring to receive encrypted messages creates a numerical encoding key that may be mathematically applied by a sender to an original message to encode the message. The recipient also creates and maintains secretly a decoding key that, when mathematically applied to the encoded message, decodes it to regenerate the original message. Each encoding key includes the product of two large prime numbers. These two prime factors can not be determined from their product without extraordinary computation efforts. The secret decoding key is also derived from the same two secret prime numbers. Each recipient posts his or her own encoding key in a public repository so that all correspondents wishing to send confidential messages to that recipient may use that recipient's key to encode messages. The public key repository is like a telephone directory, in that it enables anyone to look up a listed individual and obtain a number required for communication. Because of the difficulty of factoring the prime factors in a public encoding key, the decoding key remains secure to a degree.

The difficulty of deriving the secret decoding key from a public encoding key varies with the size of the key. With modest computing power, a small product of two primes may be factored by attempting to divide it by each successive prime number until division occurs without a remainder. Larger numbers require more sophisticated techniques, and as a general rule, factorization is more difficult with larger numbers. Using current technology, a public key expressed as a string of 512 binary "one" or "zero" bits will require several thousand hours of computer time to crack by factoring, and may be considered "difficult," but not "bulletproof." A key of 1024 bits is currently considered "bulletproof" or impossible to crack; with the best available factorization techniques, it would require all global computing resources to be devoted to the task for many years. Even as computer calculation speed increases impressively, a small increase of the key size can preserve essentially absolute security of the private decoding key.

While perfect privacy may be desired by individual correspondents, there is occasionally a need for a legitimate monitoring authority to decode a message. Such authorities may include law enforcement agencies seeking evidence of criminal activity, employers seeking to investigate dissemination of trade secrets, and governments seeking to prevent espionage by the dissemination of national security secrets, including secret communications by terrorists into and out of the country. Thus, governments may limit the size of keys to ensure that decoding messages is merely difficult, but not impossible. Unfortunately, this means that users are vulnerable to decoding of their public keys and messages by the extraordinary efforts of unauthorized interceptors or "eavesdroppers". This is of particular concern as major financial transactions and sensitive technology may need to be transmitted electronically. Thus, there is a trade-off between privacy to protect efficient commerce, and decodability to ensure national security.

In current practice, there is no limit placed on the size of public keys used in domestic communications, but keys used for international communications are limited. U.S. law is believed currently to prohibit international transmission or receipt of a communication encoded with a public key greater than 512 bits in length. As a result, a commercially sensitive communication within a multinational company, but which crosses national borders, may be vulnerable to interception and decoding, or must be restricted to less efficient means of communication. If some communications are exempted from the key length limit, such as for international banking, an opportunity exists for international espionage or terrorist communications undetectable by government investigators.

Accordingly, there is a need for an encryption system that permits correspondents to maintain an higher level of security against unauthorized interceptors, and a lesser level of security against a monitoring authority. This need is provided by a method of encoded communication in which a receiver generates a receiver public key by looking up a monitoring authority public key, multiplying four prime numbers, and encoding the identities of two of the prime numbers with the monitoring authority public key. The receiver makes his or her public key available to a sender, who creates a message, encodes it with the receiver public key, and transmits it to the receiver. The receiver then decodes the encoded message with the four prime numbers. The monitoring authority may decode the two prime numbers of the receiver's key, and factorize the product of the remaining primes. An unauthorized party would be faced with the much more difficult or impossible task of factorizing the original product of the four primes.

DETAILED DESCRIPTION OF A PREFERRED EMBODIMENT

Figure 1:
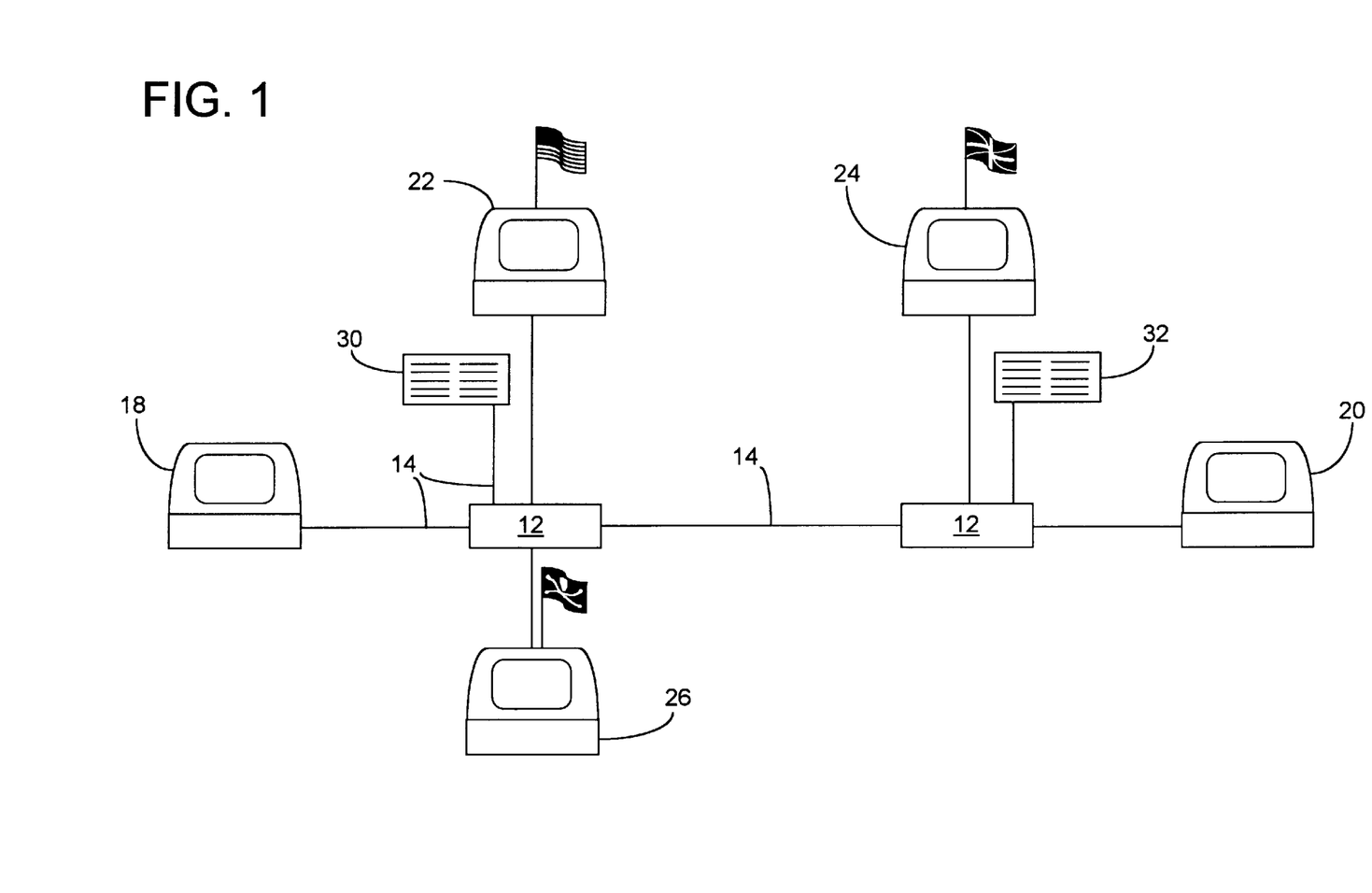
FIG. 1 is a schematic view of an electronic communication network according to a preferred embodiment of the invention.

FIG. 1 schematically illustrates a worldwide computer network 10. The network includes numerous interconnected computers 12 connected by communications lines 14, each computer being connected to at least one other computer. To provide an interface for users to communicate via the network, a plurality of terminals are connected via respective lines 14, each terminal to at least one computer 12. Shown are a sender terminal 18, a receiver terminal 20, a first monitoring authority terminal 22, a second monitoring authority terminal 24, and an unauthorized interceptor or "eavesdropper" terminal 26. While the network illustrated may be a small localized network, or a widely distributed network limited to the employees of a single organization, the example represents the internet, with the sender and the first monitoring authority located in one country, and the receiver and second monitoring authority located in another country.

Associated with the first monitoring authority is a public key repository 30, and associated with second monitoring authority is a second public key repository 32. These preferably are maintained and controlled by the respective monitoring authorities so that they do not contain unauthorized public key information. The contents are made publicly available on a "read only" basis.

To eliminate or vastly reduce the prospect that an unauthorized eavesdropper using terminal 26 will obtain and read a message sent from the sender to the receiver, the sender typically encodes the message so that only the receiver may decode it, even though the encoded message is available to many users connected to the network, including the monitoring authorities 22, 24, and the interceptor 26. When there is a need for a monitoring authority to view message contents, such as involving transmissions to other countries, ally or adversary, the authority could require that such messages be encoded with a message that may be decoded by the authority. In an RSA public key encryption system, a key's security depends on its size. The security of such a key lies in the fact that a component of the key is the product of two large prime numbers. To decode the key, the prime factors of this product must be divined. This can require substantial computer resources, but remains feasible for some entities.

Governments may prohibit international or other messages from relying on a key having a size exceeding a certain threshold, in current practice 512 bits in length. However, this may be inadequate protection against the eavesdropper. Therefore, the preferred embodiment uses a "four-prime" technique, in which encoding keys include the product of four prime factors, two of limited size, and two of larger size. The identity of the two larger of the prime factors is readily decodable by a monitoring authority, so that the authority is then faced with merely factorizing the remaining limited-sized factors should decoding be necessary. An eavesdropper is faced with the much more difficult or impossible task of factorizing the entire product, with the two factors known to the monitoring authority being large enough to make factorization essentially impossible by any known means. The size of these two larger prime factors need not be constrained by the size limit (currently 512 bits) on their product.

The preferred embodiment uses four primes and not more, because a key of a given size will provide maximum security against interceptors when the smaller of the two primes known to the monitoring authority is as large as possible, which is the case when there are only two such known primes. Further, for a given level of decodability of the larger primes, the key size may be desirably minimized by using only two such primes. Thus, the total number of prime factors is ideally four. However, it is possible to employ more than two monitoring authority-known and/or monitoring authority-unknown primes in a functional but non-optimized system.

Figure 2:
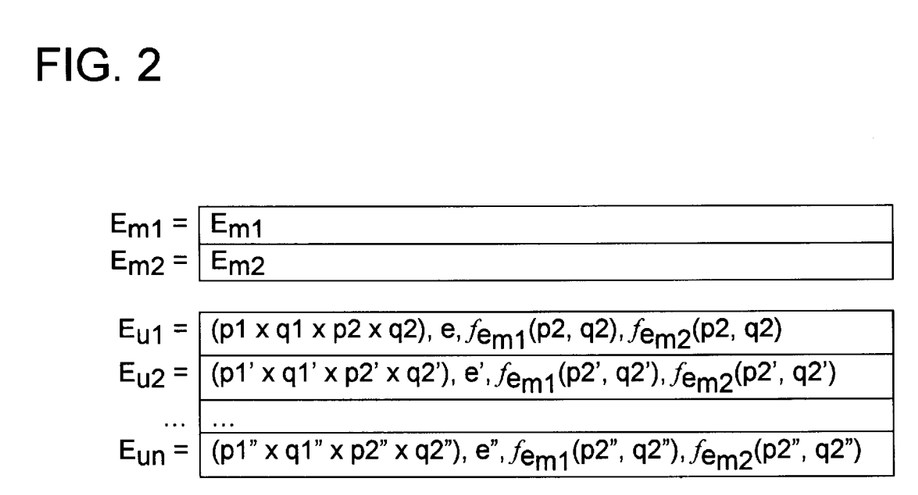
FIG. 2 is a table view of a public encoding key repository according to the embodiment of FIG. 1.

FIG. 2 shows the contents of the public ley repository 30 contained in at least one of the computers 12 than make up the network 10. The repository includes a plurality of public encoding keys $E_{m1}$, $E_{m2}$, $E_{u1}$, $E_{u2}$, ... $E_{un}$. Keys $E_{m1}$ and $E_{m2}$ are the public encoding keys of two monitoring authorities, and may each be created for each authority's chosen encryption system to enable encoding of messages to the respective authority. For example, these may be created using the conventional RSA public key encryption system.

Keys $E_{u1}$, $E_{u2}$, ... $E_{un}$ are the public encoding keys of potential message recipients. Each encoding key has been established by a potential recipient who wishes to have incoming messages encoded by senders who opt to do so. All of the recipient public encoding keys are generated according to the following steps, typically using different prime factors that are unlikely to have been selected by another user, owing to the multitude of available primes, and the improbability of users serendipitously adopting common factors. Each user's public encoding key contains a representation of the product "n" of four primes: $n=(p1*q1*p2*q2)$, followed by an encoding integer "e" relatively prime to the Euler phi function: $phi(n)=(p1-1)*(q1-1)*(p2-1)*(q2-1)$, followed by at least one instance of the encoded identities of primes p2 and q2. Two instances are shown in the illustration. These final encoded portions:

$$f_{e_{m1}}(p2, q2), f_{e_{m2}}(p2, q2)$$

are encoded using the encoding keys $E_{m1}$ and $E_{m2}$ of the monitoring authorities to which the sender and/or receiver are subject, so that only those authorities may enjoy the substantial advantage at decoding a four-prime encoding key and associated messages, as compared to an unauthorized eavesdropper, who must factorize all four factors, including the impossibly large p2 and q2 (or face the essentially impossible task of decoding the monitoring authority's robust public encoding key, then factor the remaining two limited-size primes (p1 and q1) of the recipient's encoding key. Each final encoded portion of a user's public encoding key provides an independent means for a different authority to easily determine the identities of the prime factors p2 and q2. If a message is subject to numerous monitoring authorities, numerous encoded final portions may be included in the public encoding key.

By this method, a user may select a key with two or more prime factors of large size limited only by the personally preferred level of time required to decode each incoming message, while permitting the monitoring authority to readily decode, but with a time and resource requirement (to decode the remaining two limited-size factors p1 and q1) that may be established openly and democratically, based on a society's balanced needs for privacy and security. Preferably, the product of the pair of primes p2 and q2 is substantially larger than either of primes p1 and q1. Accordingly, in the preferred embodiment, the product of p2 and q2 is larger than the product of p1 and q1. Preferably, the product of p2 and q2 is substantially larger than the product of p1 and q1, making it significantly more difficult or impossible for an unauthorized party to factorize the product. In the preferred embodiment, the product of p1 and q1 is limited by governmental regulation to 512 bits long, while the product of p2 and q2 has at least 50% more bits, making factorizing essentially impossible. Under current requirements, the substantial resources required to decode the two limited-size factors p1 and q1 would serve a deterrent to excessive governmental intrusions on communication privacy.

A dual level security system might be established in which each correspondent secretly registered a key with the monitoring authority, conveying two of the factors in a four prime system. However, this is cumbersome, creates the opportunity for such communications to be intercepted, and makes compliance checking difficult. The preferred system enables different levels of security for different entities, while all keys are public; confidential communications are not required, either to register an encoding key, or to ensure compliance. A monitoring authority may monitor compliance simply by reviewing each individual public key listed in the registry, decoding the encoded identities of p2 and q2, calculating a remaining product "W" by dividing the four-prime product n by the decoded factors: W=n/(p2*q2), and ensuring that W is an integer (actually equal to p1*q1) and complies with the established size threshold.

Figure 3:
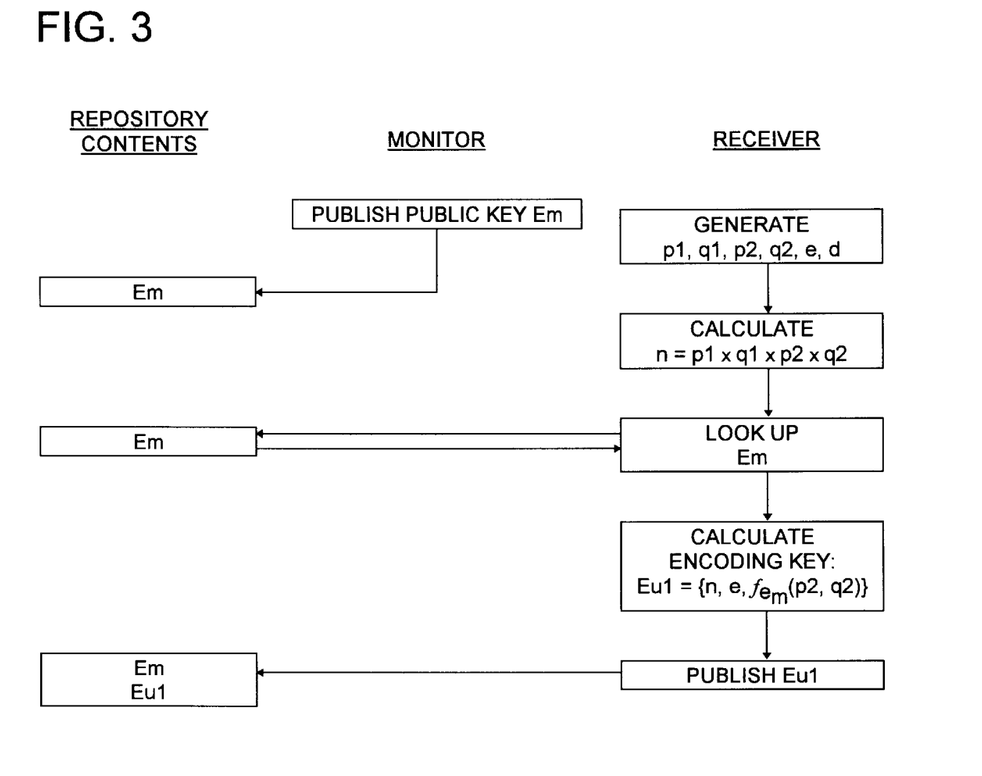
FIGS. 3–5 are flow charts illustrating a method of operation of the embodiment of FIG. 1.
Figure 4:
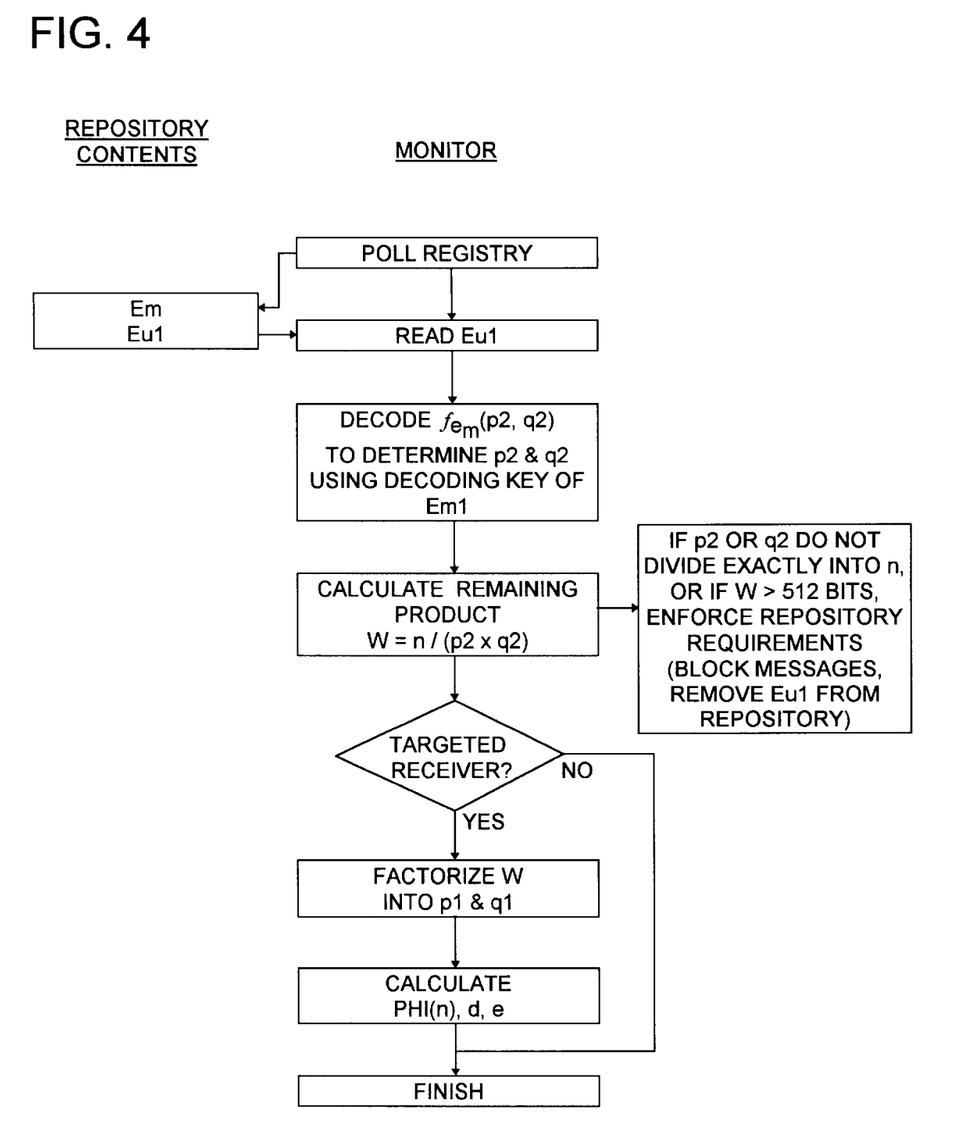
Figure 5:
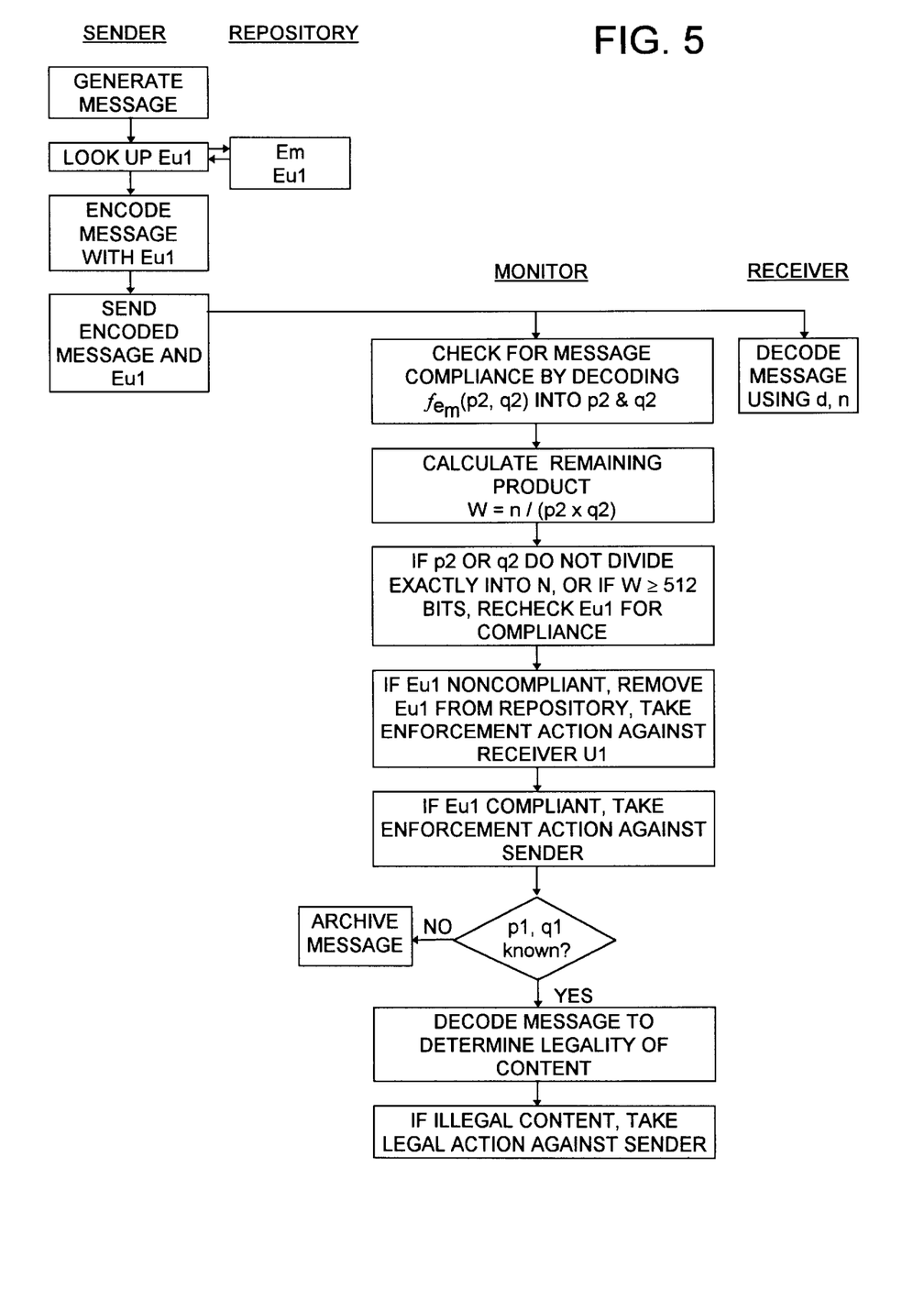

FIG. 3 illustrates the steps required for the sender to send an encoded message to the receiver, and includes the steps for a monitoring authority to check compliance of the message and to decode the message.

First, the monitoring authority creates a monitoring authority public encoding key $E_m$ as discussed above, and publishes it in the repository 30 for all to see.

Meanwhile, the receiver creates an encoding key $E_r$ by randomly selecting or generating four primes numbers, looking up the encoding key $E_m$ for the monitoring authority or authorities regulating communication within the receiver's jurisdiction, and calculating the key as described above. This includes encoding the identities of the two larger primes p2 and q2 by applying to them the monitoring authority's public key encoding function $f_{E_m}$ to generate the encoded message: $f_{E_m}(p2, q2)$. The receiver then publishes his encoding key in the repository.

After composing a message intended for the receiver, the sender looks up the receiver's public encoding key in the repository, and uses it to encode the message by an encoding technique as described below in the Detailed Additional Description and in the patent incorporated by reference. The sender may then send the encoded message. Unless the message is halted by the monitoring authority for compliance checking or decoding, it is delivered to the receiver, who may decode it the decoding technique as discussed herein.

Meanwhile, the monitoring authority may check the compliance of the receiver's public encoding key and that of any others listed in the registry, even before any messages are sent to the receiver. In some applications, the posting of such public keys may be controlled by the monitoring authority so that non-complying keys are not posted, or so the newly posted keys are automatically compliance checked by the monitoring authority, allowing the monitoring authority to be alerted if a non complying key is posted. Such procedures are discussed in greater detail below.

To check compliance, for each key the authority decodes the final encoded portion $f_{e_m}(p2, q2)$ of the user's key using a monitoring authority decoding key associated with the monitoring authority encoding key. If it is possible to decode this portion of the receiver's key, and this results in two or more prime numbers that are factors of the product in the first part of the key, the decoded factors are factored out of the product to determine a the remaining product W equal to the product of primes p1 and q1, which were not decoded. For compliance, this sub-product must be less than or equal to a certain length. With current technology, a sub-product string length of 512 bits or less is considered compliant, as discussed above. Should the monitoring authority wish to decode a message, it may undertake the substantial task of factorizing the remaining product W into its two factors (p1 and q1), permitting decoding by the conventional technique discussed below. This factorizing requires substantial computer resources to be allocated for a considerable time. Once the decoding key is known for a given receiver, decoding of future messages to the same receiver may be conducted without difficulty.

If the monitoring authority has gone so far as to obtain p1 and q1, then it may also opt whether to decode a message without delaying its transmission, or to block and hold a message before reading it to determine whether it is permissible to be read by the receiver. A message including illegal material may be considered not in compliance, and messages encoded with non complying keys that may have been privately transmitted to a sender may be blocked, even if the message is not decodable due to the non compliance.

To decode the message, the receiver has created a decoding key as a function of the prime factors used to create the encoding key. Creation of the decoding key and decoding of the message proceed by the methods discussed below.

DETAILED ADDITIONAL DESCRIPTION

Outline of the RSA Technique (U.S. Pat. No. 4,405,829):

For a receiver to set up a public key:
1. Pick two different primes, p and q.
2. Calculate n=p*q, and phi(n)=(p-1)*(q-1)

where phi(n) is the Euler Totient Function.

3. Find a value "e" relatively prime to phi(n), i.e. such that the Greatest Common Divisor (GCD) of phi(n) and e is 1. The public key is established as {n,e}, which is placed in a public repository for all to see, and which may be added to communications as part of an electronic "signature" so that replies may be encoded.
4. Find "d" such that (d*e) mod phi(n)=1, i.e. d*e=k*phi(n) for some integer k, 0<k<phi(n). {n,d} is the private key for the receiver known only to himself.

For a Sender to Send a Message to the Receiver:

5. The sender looks up the public key of the receiver and composes a message "m" as a pattern of binary bits, such that if we view "m" as a numeric value, then 0<=m<n. If the message is longer, it can be split into separate sub-messages m1, m2, etc., and the method applied separately to each sub-message.

The sender then calculates $c=(m)^e$ mod n, using e and n from the public key. The expression $(m)^e$ mod n is the so-called "power-mod function". Note that 0<=c<n, and that for m1, m2, etc., each has a corresponding c1, c2 . . . .

6. The sender sends the encrypted message "c" to the receiver by any means (usually over an electronic network.)

For the Receiver to Decode the Message "c" back to "m":

7. On receipt of "c", the receiver calculates:
   =$((c)^d)$ mod n (from the private key of the receiver)
   =$(m^{(d*e)})$ mod n (mathematically equivalent from coding)
   =$m^{(k*phi(n)+1)}$ mod n
   =m mod n (from the Euler Totient function properties) so the receiver recovers the original message "m" sent by the sender.

The difficulty of the monitoring authority and the eavesdropper in decoding an encrypted message are dependent upon factorizing the public key value "n" into its two prime factors. Any of these parties that factorize "n" into "p" and "q" are able to read messages intended for the receiver, by decoding in exactly the same way as for the receiver.

The difficulty in decryption by the eavesdropper lies in making the prime factors of "n" very large. The difficulty of factorization is governed by the size of the smallest prime, so primes of similar sizes are chosen to achieve maximum security for a given number of bits (which represent "n" in binary form). The total number of bits representing "n"

should be kept minimal for the security level desired (while anticipation some improvements in the ability to factorize and decrypt messages by the eavesdropper), because the larger "n" is, the longer messages take to encrypt by the sender and decrypt by the receiver, even when the primes p and q are know to the decoder. For a given maximum n, this also explains why the use of more than two prime factorswould result in smaller primes with less security.

Limitations of the RSA Technique

A monitoring authority may require "n" to be small enough to allow it to decode the message in a "reasonable" amount of time, but such a restriction also allows simpler decoding by the eavesdropper, which may not be acceptable to the sender and the receiver. The question of what is an "acceptable" amount of decoding time should ideally be a negotiation between the receiver (i.e. any legitimate receiver of encrypted information,) and the monitoring authority. Consideration of the eavesdropper by the receiver and the monitoring authority need not be part of the negotiations. Ideally the receiver (who ultimately selects his own public key, and therefore the security of messages sent to him) should be able to make decryption arbitrarily more difficult for the eavesdropper.

A Preferred Embodiment

The preferred method relates to providing simpler decoding for the monitoring authority without compromising security to the benefit of other parties such as the "eavesdropper." The RSA technique does not allow different decoding for the monitoring authority and the eavesdropper (i.e. only the sender, the receiver, and the eavesdropper are involved.)

The preferred embodiment follows the steps:

1. Instead of two primes as used in the RSA technique, we use four randomly selected primes, p1, q1, p2, q2, all of different values. We calculate:

$$n=p1*q1*p2*q2$$

2. From the definition of phi(n) we get for these four primes:

$$phi(n)=(p1-1)*(q1-1)*(p2-1)*(q2-1)$$

The other encryption and decryption steps are essentially the same as the existing RSA technique for the sender, and the receiver. It is notable that the use of four primes is counterintuitive to the concept of increased security. In conventional two-prime systems with a key of a given size, security is a function of the size of the smallest prime factor. Increasing the number of factors would substantially reduce security for a given key size.

3. The monitoring authority must have a public key of its own, possibly using the "RSA" technique or any public key encryption system, including the four-prime system. This requirement is different from the standard RSA technique. When the receiver wishes to register his public key in a public key repository, he finds {n,e} as described for the "RSA" technique but using four primes as described above. In addition the receiver encrypts two of his four primes, p2 and q2 using the monitoring authority public key, into a message "g". Then {n,e,g} are placed into the public key repository under the receiver's name.

4. When the sender encrypts a message to send to the receiver, the sender looks up the receiver's encoding key in the repository, and extracts "n" and "e" for encryption, but cannot interpret the "g" part of the public key of the receiver.

5. The sender then encrypts the message using the encoding technique common to "RSA" and the four-prime technique, and encapsulates the encoded message with the {n,e,g} public encoding key of the receiver. The sender then sends the resulting encoded message to the receiver.

6. If the monitoring authority is able to intercept the message (with the encapsulated public key of the receiver), it can retrieve {n,e,g}, and using its private key, decode "g" to give p2 and q2. It can then calculate n/(p2*q2)=W and check that W (=p1*q1 from above) is less than some length limit (in bits) required by the monitoring authority of the receiver. If p2 and q2 do not both divide into "n" exactly, or if W is outside the required size limit, then the message is deemed to be noncompliant, with the receiver in violation (not the sender, who is after all, just automatically using the public encoding key of the receiver, probably with software that can not detect violations). In other words, it is the responsibility of the receiver, when generating their public key, to make sure that the key complies with the requirements of the monitoring authority.

7. If sufficient real-time processing is available, and if the monitoring authority can route messages through its system before relaying the message to the receiver, then the monitoring authority can block violating messages from ever reaching the receiver. If delays are unacceptable, messages can be stored for subsequent non-real-time analysis to look for noncompliant public keys.

8. If the monitoring authority wishes to decode the message, it must find the prime factors of "W", or p1 and q1 using factorization techniques. The problem of factorization is most difficult when p1 and q1 are both about equal in size. The monitoring authority sets the number of bits size limit of W=p1*q1 such that the receiver feels that the monitoring authority has to do a difficult factorization to decode the message, and that the monitoring authority is not able to capriciously decode any or all messages, and yet with some reasonable effort, the monitoring authority can factorize W into p1 and q1, and therefore decode the message.

9. If the message sent by the sender to the receiver is intercepted by the eavesdropper, then for the eavesdropper to decode the message, he must factorize "n" into all four prime factors, p1, q1, p2, q2. If the monitoring authority can find p1 and q1 with a "reasonable amount" of computation, then so can the eavesdropper, but the eavesdropper doesn't know p2 and q2, so these primes can be made much larger than p1, q1, effectively barring further progress on decryption of the message by the eavesdropper. For maximum encryption effectiveness, the magnitudes of p2 and q2 should be comparable.

10. The public key of the monitoring authority has been used to encrypt all the p1 and q1 values in the public key repository, so for security against decoding by the eavesdropper, it is recommended that a very secure key be used by the monitoring authority.

11. The monitoring authority can scan the public key repository, and determine whether a public key {n,e,g} is legal (using the technique above in step 6 above), or even go further and factorize the remaining primes p1 and q1, allowing the monitoring authority to rapidly decode all messages intended for the receiver (just as the receiver would decode his own messages). This can be done in advance of transmission or receipt of a message using the public key in the repository, without having to wait for the public encoding key {n,e,g} of the receiver to arrive encapsulated into a message.

12. Two monitoring authorities 22 and 24 can each have authority over their respective repositories 30, 32, such that the receiver would:

a) generate "g1" from p2 and q2 and the public key of monitoring authority 22, and place {n,e,g1} in repository 30, b) generate "g2" from p2 and q2 and the public key of monitoring authority 24, and place {n,e,g2} in repository 32.

Typically, the two monitoring authorities 22 and 24 might be at the sending and receiving end of a message between the sender and the receiver.

The sender would then encode a message by reading the public key repositories of the receiver in the repositories for the sending end and the receiving end, and then encapsulating {n,e,g1,g2} with the encrypted message. This would allow the two monitoring authorities 22 and 24 to decrypt the message sent, using the method required. Each monitoring authority could try both values of "g" to see which decoded message made sense, or additional identifying text information "i" could be placed with the public key to say which the monitoring authority the value of "g" can be decoded by.

13. The four-prime encryption technique is slower than the RSA technique for encryption and decryption, but as most such encryption schemes are merely used to send a session key to a conventional coding technique (not public key) such as DES, IDEA, RC2, RC4, RC5, the slowdown should be acceptable, particularly if specialized hardware for performing the "power-mod" function is provided.

The same magnitudes of the primes p1, q1 for the four-prime technique compared against "p", "q" for the RSA technique gives equal levels of security against the monitoring authority.

14. Four-prime decryption may be performed more rapidly using a 4-residue number system where each modulo is one of the public key primes, as in the well known Chinese Remainder Theorem.

15. The disclosed technique and system preferably employ keys using products of four prime numbers. The use of more than four primes factors will increase key size without necessarily improving security. The use of fewer than four will reduce protection against inappropriate decoding by a monitoring authority. Using only two large primes and encoding their identities with the monitoring authority public key would provide unlimited protection against other eavesdroppers, but would have the unfortunate result of making governmental monitoring of many or all citizens' electronic communications trivially simple. The potential for abusive intrusions on privacy would make such a system unacceptable in a free society.

Procedure for Changing Public Keys

In a public key system, users may need to change their public keys occasionally. Three reasons are:

a) They have reason to believe their key has been broken (compromised).

b) Their computer system (with its private key) has been stolen.

c) Increasing computer power will soon make their key size obsolete.

A possible monitoring problem arises from key changes. With the four-prime scheme, if a receiver keeps changing his public key, and that receiver is targeted for full decoding by a monitoring authority, then the monitoring authority would have to keep re-factorizing W=(n/(p2*q2)) to obtain the prime factors p1 and q1, which means that during that period they would be unable to read the messages sent to the targeted receiver.

To avoid this problem, the monitoring authority can insist that all new public keys maintain the values of the p1 and q1 factors for at least an extended period of time. A receiver may be permitted to regenerate new public key values of p2, q2, e, and g (the monitoring authorities coded version of the two prime factors p2 and q2). This allows the monitoring authority to carry on decoding messages to a targeted receiver without any break of continuity. If such a break occurred, potentially damaging messages could be sent to the targeted receiver while the monitoring authority is unable to decode the message until the new p1 and q1 were obtained (which may take some time).

The monitoring authority can check compliance with the requirement that p1 and q1 are preserved by insisting that the custodian of the public key repository send the proposed new key, and (if it is a key change rather than a first key) the corresponding old key.

The monitoring authority then checks the remaining product W to ensure that:

$$W(old)=W(new)$$

If not, the new public key is noncompliant, and could be held in violation by the monitoring authority, and the reply to the waiting repository would be an application denial. Note that this test does not require that the monitoring authority actually conduct the arduous task of factorizing to obtain p1 and q1. Therefore, this test may be applied uniformly to all new key change requests from targeted or untargeted receivers, without a substantial investment of resources.

To avoid bottlenecks that might occur were the monitoring authority compelled to delay replies for confirming key changes, a preferred embodiment would allow the monitoring authority, at its convenience (on or before the effective date) to send back a message to the repository containing the new public key with two additional fields containing:

a) the effective date on or after which the key can be used.

b) The monitoring authority signature of all the other fields in the public key (including the effective date above).

Note that section b) allows the repository to check that the message is from the monitoring authority, and further allows the monitoring authority to later poll the repository and check that no tampering has occurred en-route or by an improperly operated repository.

The repository could then either wait until this effective date was reached and then replace the corresponding old public key with the new public key, or immediately place the new key into the main repository and move the old key into an archive database (which may have to be used until the new key is effective).

A new receiver (with no old key) that is targeted by the monitoring authority, may cause the monitoring authority to delay the effective date of a new public key to the repository until it has factorized W to p1 and q1. So that individuals targeted for scrutiny are not alerted to this fact, a standard minimum delay may be implemented in all first key applications.

When a sender send a message to a receiver, the mth monitoring authority can now check their parts of the message (i.e. n, e, i_m, g_m, effective_date_m) with their signature for tampering. They can also check that the effective date is on or earlier than the current date. They can then perform the other standard checks, such as confirming W=n/(p2*q2).

There may arise an occasional need for a receiver being able to change the p1 and q1 components of their key. For example, a new size limit on the product of p1 and q1 might be established by the monitoring authority, which could allow or compel the receiver to change that part of the key size. Presumably, given the larger sizes of p2 and q2, which provide essentially all the security against unauthorized eavesdropping, there may be no other logical reason for a receiver to change p1 and q1, unless p1 and q1 become publicly known and therefore known to the monitoring authority.

The ability to change p1 and q1 can be limited by setting a date before which p1 and q1 may not be modified. This feature can be supported by adding a "modifiable_p1_q1" date field to the public key. Once the modifiable_p1_q1 date has arrived, the receiver is at liberty to submit new public key values of p1 and q1, (as well as p2 and q2, where unscheduled changes are always possible), and other corresponding values in their public key.

The modifiable_p1_q1 date field should also be included in the signature mentioned above, otherwise it could also be tampered with before being placed in the repository.

For applications involving changes in p1 and q1, (subject to standard checks to find W), the effective date can be the later of the old modifiable_p1_q1 date and the current date, plus a minimum delay required by the monitoring authority for possibly factoring W into p1 and q1.

If there are no changes detected in p1 and q1, the old modifiable_p1_q1 date is automatically sent back as the new modifiable_p1_q1 date for updating the repository. The effective date can be set to the current date to be enabled immediately at the repository. This procedure maintains the true p1 and q1 modifiable_p1_q1 dates through any number of receiver-driven changes to their public key.

Preferred and Alternative Embodiments of the Invention

Paragraph 1. A method of generating an "RSA"-type public key comprising:

a) using four distinct primes: p1, q1, p2, q2, instead of two for the prior method, b) Encrypting two of the four primes, p2 and q2 using the public key of a monitoring authority, into a value "g" such that only the monitoring authority can decrypt and read the value of these two primes.

c) Constructing a public key, which in addition to the two numbers {n,e} used for "RSA" technique, the key also comprises of the value "g". The message {n,e,g} comprises the new public key.

Paragraph 2. A method of message encryption comprising:

a) extracting the values {n,e} from the public key of the recipient of the message, b) using the "RSA" technique, by coding a message "m" using:

$$c=(m)^e \bmod n$$

c) Including plain-text identification "i" of the monitoring authority whose public key was used to encrypt p2 and q2 in Paragraph 1, step (b)

d) combining {c,n,e,i,g} into an encapsulated message, such that the values i, n, e, are directly readable by anyone who intercepts the message, although the encrypted message part "c" and "g" are not thus readable.

Paragraph 3. A method for a monitoring authority to verify a public key as compliant in a repository in its jurisdiction, and message compliance within its domain, comprising:

a) extraction of "g" and "n" from a public key in its repositories, or by extraction from an intercepted message, b) decoding "g" using its private key, so obtaining p2, q2. It can then check that:

c) The values p2 and q2 both divide exactly into the corresponding "n".

d) The value W=n/(p2*q2) is itself within a prescribed size limit defined by the monitoring authority.

Paragraph 4: A method for a monitoring authority to decode a message comprising:

a) Finding W=n/(p2*q2) as noted in paragraph(3), b) finding the factors of W (p1 and q1) using any known prime factorization technique, c) Finding phi(n), (p1−1)(q1−1)(p2−1)(q2−1), d, e mod phi(n)=1 and "d" such that $$(c)^d \bmod n = m^{(d*e)} \bmod n = m$$

d) Determining the original message.

Paragraph 5: A method of encrypting for more than one monitoring authority with jurisdiction over a message, comprising:

a) automatically collecting the public keys of the recipient in the relevant jurisdictions of the message (usually the sender and receiver, so the jurisdictions are known), b) verifying that the values of n,e are equal in each public key repository so obtained in (a) above for the recipient of the message, c) encrypting the message as in Paragraph 2, but with the information:

{c,n,e,i1,g1,i2,g2 . . . } for however many monitoring authorities required.

Paragraph 6: A method of decryption for each monitoring authority comprising:

a) extracting the plain text identifying the monitoring authority "i" as in Paragraph 2 (c), and thereby obtaining the corresponding "g", (the recommended method), or by testing for compliance using each "g" in the header as in Paragraph (3), b) verifying that at some point it could decode the message completely, comprising method (4), if required.

c) treating any message failing to include all the required information required by that monitoring authority as not in compliance.

The disclosure is made with reference to preferred and alternative embodiments, but the following claims are not intended to be so limited.

I claim:

1. A computer system for monitoring the compliance of a public encoding key comprising:
   a key generator for generating a monitoring authority public key from a monitoring authority data set;
   acquisition means for acquiring the monitoring authority public key;
   analysis means for determining if the public encoding key is in compliance by:
      separating the key into a first portion and a second portion,
      decoding the second portion via the monitoring authority data set to yield at least one prime number, and
      dividing the first portion by the at least one prime number to yield a remaining product.

2. The system of claim 1 wherein the computer system further includes a monitoring authority decoding key, and decoding the second portion comprises determining a function of the decoding key and the second portion.

3. The system of claim 1 wherein the analysis means is operable to determine whether the remaining product is above a preselected threshold.

4. The system of claim 3 including enforcement means for preventing use of the public encoding key if the remaining product is above the preselected threshold.

5. The system of claim 1 including factorizing means for factorizing the remaining product into its prime factors.

6. A method of enabling encrypted communication to a receiver comprising:
   generating an encoding key by:
      selecting a plurality of prime numbers
      calculating a product of the prime numbers;
      determining a public key of a monitoring authority;
      encoding the identity of at least one of the prime numbers with said public key;
   and
      making the encoding key available to a sender.

7. The method of claim 6 including generating a decoding key as a function of the plurality of prime numbers.

8. The method of claim 7 including decoding an encrypted message by applying a function to the encrypted message and to the decoding key.

9. The method of claim 6 wherein the second portion includes the encoded identity of two prime numbers.

10. The method of claim 6 including connecting to a computer network.

11. A method of encrypted communication between a sender and a receiver comprising the steps:
    looking up a monitoring authority public key generated from a first data set;
    generating a receiver encrypting key including:
    generating a first receiver encrypting key portion based on at least a second data set;
        generating a second receiver encrypting key portion by mathematically applying the first monitoring authority public key to said second data set, such that a communication encrypted with the receiver encrypting key has differential security levels with respect to the monitoring authority relative to an unauthorized interceptor.

12. The method of claim 11 wherein the second data set includes at least a prime factor.

13. The method of claim 11 wherein the first portion of the receiver encrypting key is based on a product of at least two prime factors, and the second portion of the receiver encrypting key includes the encoded identity of the prime factors, as encoded via the monitoring authority public key.

* * * * *